United States Patent
Krebs

[11] Patent Number: 5,188,143
[45] Date of Patent: Feb. 23, 1993

[54] WATER LEAKAGE DETECTION DEVICE

[76] Inventor: Robert G. Krebs, 725 N. Irena Ave., #1, Redondo Beach, Calif. 90277

[21] Appl. No.: 848,078

[22] Filed: Mar. 9, 1992

[51] Int. Cl.⁵ ............... H01H 29/06; G08B 21/00; F16K 31/02
[52] U.S. Cl. ........................ 137/312; 73/313; 122/504.2; 126/388; 137/392; 200/61.04; 200/DIG. 2; 200/DIG. 40; 200/DIG. 41; 340/515; 340/605; 340/620
[58] Field of Search ............... 137/312, 392; 122/504, 122/504.2, 507; 126/344, 374, 383, 388; 307/118, 112, 113; 200/61.04, 61.05, DIG. 2, DIG. 40, DIG. 41; 340/604, 605, 620, 623, 624, 625, 514, 515; 73/313; 361/178; 341/20, 32

[56] References Cited

U.S. PATENT DOCUMENTS

| | | | |
|---|---|---|---|
| 3,069,671 | 12/1962 | Taylor | 137/312 |
| 3,473,553 | 10/1969 | Collins | 122/504 |
| 3,705,424 | 12/1972 | Harvey, Jr. | 200/DIG. 2 |
| 3,874,403 | 4/1975 | Fischer | 137/312 W X |
| 4,380,243 | 4/1983 | Braley | 200/61.04 |
| 4,805,662 | 2/1989 | Moody | 137/434 |
| 4,845,472 | 7/1989 | Gordon et al. | 200/61.04 |
| 4,944,253 | 7/1990 | Bellofatto | 137/312 |
| 5,029,605 | 7/1991 | Dowling et al. | 122/507 |

Primary Examiner—George L. Walton
Attorney, Agent, or Firm—Roger A. Marrs

[57] ABSTRACT

A water leakage detector is disclosed herein sensitive to the presence of moisture, having an elongated sensor strip comprising a pair of conductors separated by insulation. Each conductor includes an electrode coupling with a wire lead extending via a cable to an electrical plug. A circuit housing is provided having an audible alarm operably connected to an electrical socket adapted to detachably connect with the plug. A low voltage battery and auxiliary output socket are carried on the housing and connected with the alarm and the first mentioned socket whereby the presence of moisture across the pair of sensor conductors activates the alarm. A battery test pair of electrodes is provided to manually test battery condition.

6 Claims, 1 Drawing Sheet

WATER LEAKAGE DETECTION DEVICE

BACKGROUND OF THE INVENTION

1. Field of the Invention

The present invention relates to moisture protection devices, and more particularly to a novel water leakage detector adapted to operate an audible alarm in response to the presence of moisture electrically coupling a pair of conductors together so as to complete an electrical circuit, which includes a low voltage battery as a power source and a battery test means for testing the condition of the battery.

2. Brief Description of the Prior Art

Although a multiplicity of water detection devices have been employed in the past, most of such devices are limited in their application and operation to include solenoid-operated valves or the like which are incorporated into plumbing for shutting off a supply of water in the event of water leakage. Such an example is disclosed in U.S. Pat. No. 4,805,662. Problems and difficulties have been encountered with such prior devices, which stem largely from the fact that installation requires technical competency and is usually involving high voltage power sources such as 110 volts or more. Also, the sensing element itself, in most cases, is a flat square of metal material that is placed on the ground, such as near a water heater, so that leakage will contact the plate and complete a circuit for operating the solenoid valve or other alarm. Such detectors are limited to the presence of water in their immediate location and the detector is not susceptible for placement over a wide area, such as encircling a ground area immediately beneath the water heater, as opposed to a specific spot.

Another problem resides when prior art detectors employ battery power which fails to provide a testing means for determining the condition of the battery power or energy level. Such prior systems incorporate expensive switches and sometimes are not connected to any alarm system so that the alarm system is not checked as well. Therefore, the prior art use of solenoid-operated valves, electrical switches and high voltage power sources adds to expense, complexity and inefficiency of operation. A need exists to provide a novel water leakage detector which can be operated from a low voltage source with a testing means for checking the battery energy level as well as checking the alarm system itself. Such a novel device should include means for not only operating in the presence of a moisture or water condition but should be adaptable for operating when a given level of water has been reached as well.

SUMMARY OF THE INVENTION

Accordingly, the above problems and difficulties are obviated by the present invention which provides an elongated strip sensor or detector which is sufficiently flexible to be strategically placed about the undersurface of a water container such as a hot water heater. In one form of the invention, the sensor or detector includes a pair of electrical conductors arranged in fixed spaced-apart relationship and separated by insulator material wherein each conductor includes an electrode coupling a lead wire thereto. The pair of lead wires terminate in an electrical plug adapted to be detachably connected with an electrical socket carried on a circuit housing. An audible alarm, such as a buzzer, for example, is carried on the circuit housing and is connected to the input socket by an electrical circuit which incorporates a low voltage battery and a pair of electrodes coupled in parallel suitable for use as a battery and buzzer tester when crossed by a moist finger of the user. The sensor or detector further includes means along the top so as to prevent inadvertent connection of the electrical conductors so that the conductors are exposed only to the presence of moisture or a level of moisture present on the floor or ground on which the detector or sensor is placed.

Accordingly, it is among the primary objects of the present invention to provide a novel moisture leakage detector which is flexible and is detachably coupled to an audible alarm and low voltage battery system including a battery and alarm checker which is easy to install and may automatically operate in the presence of moisture or water.

Another object of the present invention is to provide a novel water leakage detector which will operate when a predetermined level of water has been collected.

Still another object of the present invention is to provide a novel low cost water leakage detector that may be strategically located over a wide area beneath a water container, such as a water heater, so that early detection of leakage will automatically set off an alarm.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
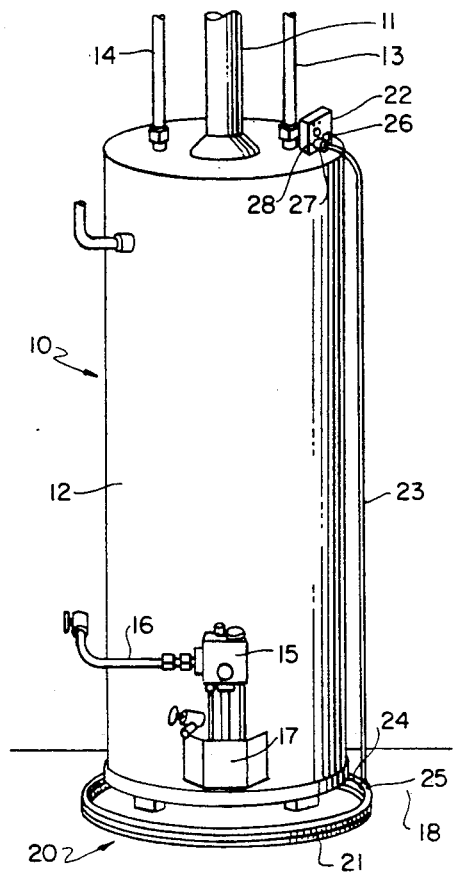
FIG. 1 is a front perspective view of a conventional water heater incorporating the novel moisture leakage detector of the present invention.

Referring to FIG. 1, a conventional hot water heater is generally indicated by the reference numeral 10 which consists of an internal water tank (not shown) which is contained by an outer housing 12 having a vent 11 and a cold water inlet 13 and a hot water inlet 14. The housing is of the conventional type having normal layers of fiberglass insulation. A pilot light control is indicated by numeral 15, as well as a conventional gas line 16 which feeds the pilot light directly behind shield 17.

The hot water heater 10 is illustrated for illustrative purposes as a typical water containing device which is subject to leakage sometime during its operational life. Therefore, it is to be understood that the present invention relates to detection of water leakage not only from hot water tanks but from other water containing structures. As is the usual practice, such water containers are supported on the ground or a floor 18 and should leakage occur, the water would drip or run directly onto the floor beneath the water heater 10 and commence to spread outwardly as the water is collected on the floor. Such disposition of the leaked water may be slow or may be rapid depending on the size of the leak and the amount of water carried in the water tank itself. Also, it can never be predicted when a leak will occur or at what particular location on the bottom of the tank will be the source of the leak. Therefore, a spot leakage detector randomly placed anywhere beneath the water tank may not sense a water leak until a substantial amount of water has been leaked and collected on the floor 18 so as to reach the exact location of the sensor or detector.

Further relating to FIG. 1, the novel water leakage detection system of the present invention is illustrated in the general direction of arrow 20, which includes an elongated, flexible sensor or detector 21 comprising an integral strip which may be flexed in a tortuous path about the bottom of the water heater 10 resting on the floor 18. If desired, the flexible strip sensor or detector may be laid in a circular pattern, as illustrated, so that regardless of how the leaked water may flow, contact of the water with the detector 21 will be assured. The sensor or detector 21 is coupled to an electrical circuit within a circuit housing 22 that may be placed on top of the water heater or may be placed in any other location that is desired. The sensor or connector 21 is coupled to the circuit within the housing 22 by means of cable 23 encapsulating a pair of lead wires connected respectively to connectors 24 and 25. Circuit housing 22 includes an audible alarm, such as a buzzer 26, and a socket 27 into which the plug 28 carried on the end of the cable 23 is detachably connected. Therefore, when moisture or water collects on the floor 18 and is detected or sensed by the detector 21, an electrical circuit is completed which initiates the audible alarm 26. The alarm gives a strong indication of the leakage problem and may be heard at a substantial distance and even through walls.

Figure 2:
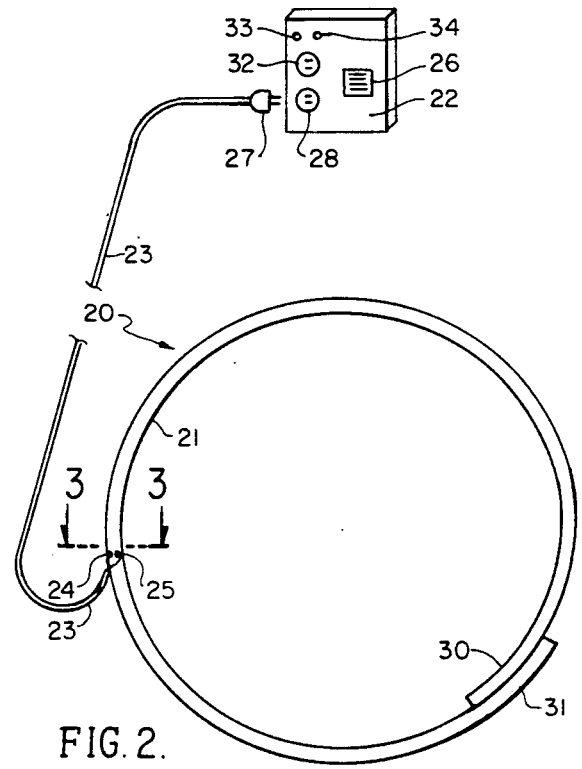
FIG. 2 is a top plan view of the water leakage detector system utilized in FIG. 1.

Referring now in detail to FIG. 2, it can be seen that the sensor or detector 21 is an elongated strip having overlapping ends 30 and 31 which may be joined together by any suitable fastener, tape or snap-lock connector. In some instances, the opposite ends 30 and 31 need not be coupled together but may be remote from one another such as when the elongated detector is laid out in a tortuous or twisting path. The circuit housing 22 not only includes the inlet socket 28 for receiving the plug 27 and the buzzer or audible alarm 26, but includes an auxiliary socket 32 into which a suitable electrical plug can be inserted in order to derive battery power from the internal battery within the housing 22. Also, the housing 22 mounts a pair of electrodes 33 and 34 serving as a battery and alarm circuit test. The electrodes are connected to the internal battery and the user simply needs to place his moist fingertip across the two electrodes so as to complete the circuit supplying battery power to the buzzer for testing the circuit. Upon removal of the finger, the alarm may continue, particularly if there is any moisture interconnecting the electrodes. However, the circuit test is momentary and will not last for more than a few seconds.

Figure 3:
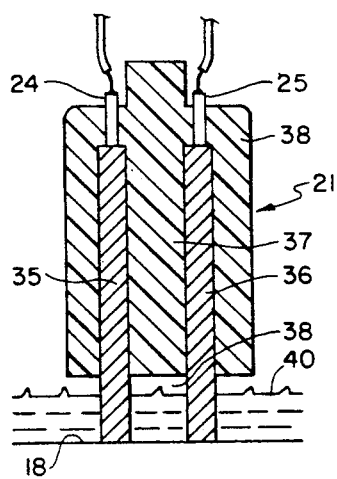
FIG. 3 is a greatly enlarged transverse cross-sectional view of the detector or sensor used in FIG. 2 as taken in the direction of arrows 3—3 thereof.

Referring now in detail to FIG. 3, an enlarged view of the detector or sensor 21 is illustrated as comprising a pair of conductors 35 and 36 which are arranged in fixed spaced-apart parallel relationship and as being separated by an insulation material, indicated by numeral 37. The insulation material extends between the conductors 35 and 36 so as to leave a gap, indicated by numeral 38, between the opposing surfaces of the conductors at the end of the conductors engaging with the floor 18. As the leakage water disposes between the connectors 35 and 36 at their ends engaged with the floor 18, an electrical circuit will be completed through the wire leads 24 and 25 to supply battery power to the buzzer.

Figure 4:
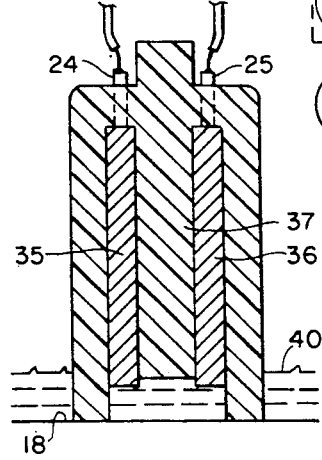
FIG. 4 is a view similar to the view of FIG. 3 illustrating an alternate embodiment of sensor or detector.

Referring now in detail to FIG. 4, it can be seen that the completion of the electrical circuit between the conductors 35 and 36 is delayed until the level of the leakage water 40 has risen to the height of the end of the conductors 35 and 36. In this embodiment, the insulation 37 engages with the floor 18 and completion of the circuit is delayed until the leakage water increases to the level contacting the conductors 35 and 36. With respect to the embodiment shown in FIGS. 3 and 4, it is to be understood that the engagement of the conductors or the insulation with the floor 18 is not a sealing relationship so that moisture or water will seep between the conductors 35 and 36 to establish electrical circuit relationship. Also, it is to be noted that an insulative means 38 is provided over the top of the insulation and conductors so that inadvertent contact with conductive metal or fluids will not energize the alarm.

Figure 5:
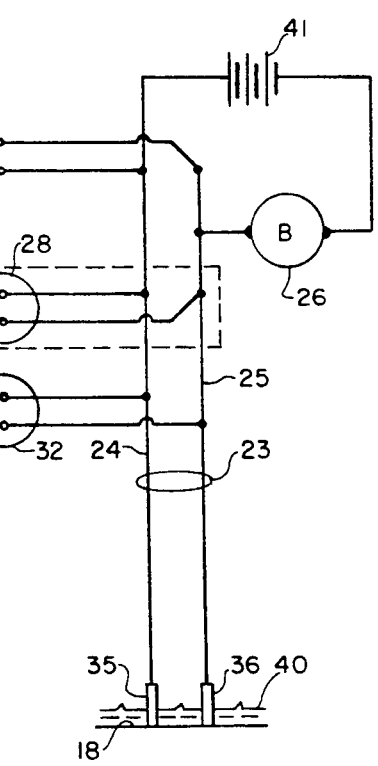
FIG. 5 is a schematic drawing illustrating the circuit and the components of the system incorporating the present invention.

Referring now in detail to FIG. 5, the electrical circuit is illustrated in which the low voltage battery, such as 15 volts, is employed and represented by the numeral 41.

In view of the foregoing, it can be seen that the novel leakage detector of the present invention provides a means for detecting the presence of a moisture or water leak and a means for signalling that the leak has occurred. The system and device is a new inexpensive water leakage detecting means which is simple to install around any cylindrical or other shaped water vessel. The battery test is operated by simply having the user wet his finger and place it across the test terminal electrodes 33 and 34 respectively. When installed on water heaters, the novel detection system and device provides warning of costly repairs or replacement of carpeting, furniture, cleanups, and sometimes ceilings due to water leakage. Furthermore, such heaters in remote locations may be leaking for long periods of time so as to increase gas or electric bills. The system and device can also be employed as a depth gauge to signal if water or liquid gets beyond a predetermined height. For example, such uses are in connection with sump pumps and, if desired, the system and device may be useful on boats to warn if water is present in compartments not intended to be wet. Detection of overflow spills is provided, as well as indication of running water or the like. The sensor or detector 21 is positionable to desired locations on the floor and the entire system is portable in that it can be simply removed from one water container and relocated to another.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A water leakage detector comprising:
   an elongated flexible sensor having a pair of band conductors separated in fixed spaced-apart parallel relationship and further having two opposite ends adapted to be overlapped to provide a continuous sensor;
   said conductors encased in insulative material with a portion of each conductor exposed to contact leakage water;
   an audible alarm coupled to said sensor flexible band conductors at any desired location along said continuous sensor responsive to leakage water contact of said exposed conductor portions to initiate an audible signal; and
   a low voltage battery source of power selectively coupled between said audible alarm and said sensor.

2. The invention as defined in claim 1 including:
   a battery and audible alarm test means coupled in parallel with said sensor to said audible alarm and said battery source of power.

3. The invention as defined in claim 2 including:
   an outlet socket coupled in parallel with said battery source of power to provide an auxiliary source of power.

4. The invention as defined in claim 3 wherein:
   said sensor includes means for elevating said sensor above floor level so as to be responsive to water leakage of a given height.

5. A water leakage detector comprising:
   an elongated, flexible water sensor having parallel conductors terminating in opposite ends adopted to be over-lapped to provide a continuous sensor;
   an audible alarm;
   a low voltage battery source of power;
   a battery and alarm test means electrically connecting said audible alarm and said battery source of power together in parallel with said water sensor;
   said water sensor selectively coupled at any desired location along said sensor conductors and to said battery source of power responsive to the presence of water contact with said sensor conductors to initiate power to said audible alarm;
   said alarm test means includes a pair of electrodes in fixed spaced-apart relationship connected in parallel with said audible alarm to said battery source of power; and
   said spaced-apart electrodes define a gap adapted to be bridged by the moist finger of the user to momentarily energize said audible alarm.

6. The invention as defined in claim 5 wherein:
   said sensor comprises a pair of elongated conductors separated by insulation;
   connectors attached to each of said conductors respectively;
   an insulative means sealing said conductors to said separating insulation; and
   a portion of said conductors exposed from said insulative means and said separating insulation adapted to be contacted by leakage water to complete an electrical circuit.

* * * * *